Jan. 25, 1927.

R. T. ROMINE 1,615,813

METHOD OF HANDLING MATERIAL

Original Filed March 11, 1926    6 Sheets-Sheet 1

INVENTOR=
Robert T. Romine
BY Macleod, Calver, Copeland & Dike
ATTORNEYS.

Jan. 25, 1927. 1,615,813
R. T. ROMINE
METHOD OF HANDLING MATERIAL
Original Filed March 11, 1926   6 Sheets-Sheet 2

INVENTOR=
Robert T. Romine
BY Macleod, Colver, Copeland & Dike
ATTORNEYS.

Jan. 25, 1927.  
R. T. ROMINE  
1,615,813  
METHOD OF HANDLING MATERIAL  
Original Filed March 11, 1926   6 Sheets-Sheet 5

INVENTOR=  
Robert T. Romine  
by Macleod, Calver, Copeland & Dike  
ATTORNEYS

Patented Jan. 25, 1927.

1,615,813

UNITED STATES PATENT OFFICE.

ROBERT T. ROMINE, OF MOUNT CLEMENS, MICHIGAN.

METHOD OF HANDLING MATERIAL.

Original application filed March 11, 1926, Serial No. 93,871. Divided and this application filed May 14, 1926. Serial No. 109,124.

This invention relates to the loading, transporting and unloading of heavy or bulky loads in units in freight cars without necessitating the breaking up of the units or bundles and the separate manual handling thereof in piling or stacking the material. The invention in particular has to do with the handling in units of entire stacks or piles of sheet steel or similar metal such as metal plates, strip or bar steel.

An object of the invention is to improve the methods of handling, loading, unloading and in general the shipping of finished steel or the like from the steel mills, eliminating the labor heretofore required in stacking or piling by hand in cars the metal, sheet steel or the like, and also eliminating among other things the damage to the freight cars and the metal sheets heretofore resulting during transit from previous impracticable and inadequate methods of shipment.

Other objects of this invention will appear in the following description and appended claims, reference being had to the accompanying drawings forming a part of this specification, wherein:

Before explaining in detail the present invention, and the method or mode of operation embodied therein, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended or the requirements of the prior art.

This application is a division of my copending application Serial No. 93,871, filed March 11, 1926, for loading and unloading apparatus.

Heretofore no means has ever been provided for (1) loading or unloading and (2) packing sheet metal or steel in freight cars for shipment without requiring considerable manual labor, while at the same time during transit preventing the sheets from breaking loose or moving in the car as a result of collisions, shocks, jolts, etc., to which the cars are constantly subjected during transit and when shunted in the freight yards. Sheet metal or steel has heretofore been piled or loaded by hand in the cars, and the universal practice in packing the same has been to use timbers or wood buttresses nailed to the floor of the car in the attempt to hold the sheets in position, which practice has been invariably unsuccessful in preventing the sheets from breaking loose and becoming damaged as well as damaging the car. When loaded as heretofore it frequently happened that the pile or stack of sheets was driven against the end of the car resulting in smashing or breaking out the wall of the car causing great damage, entailing constant expense and repair, and resulting in great damage to the sheets themselves.

In the case of sheet steel, such as used for automobile bodies, it has been necessary to oil the finished sheets or plates to permit ready handling a well as to protect them against scratching. The fact that the sheets have been shipped with the surfaces of the sheets in oiled condition increased the tendency of the sheets to slide upon each other and break loose in the car.

In all loading and unloading operations it was heretofore necessary to handle each sheet separately. The metal was hauled by hand in relatively small units, and each sheet unloaded in the car by hand. The sheets were handled by sliding one sheet on another and despite the fact that the surfaces of the sheets were oiled, an appreciable proportion of the sheets were scratched, rendering them defective, and resulting in considerable loss. On account of the necessity of handling each sheet, considerable labor expense was involved in loading and unloading a car having for instance a load capacity of forty tons.

The present invention eliminates the handling of the sheets separately, thereby saving considerable labor expense, as well as enabling bulky or heavy material to be loaded, transported, and otherwise handled in bulk or bundles.

In the case of sheet steel for instance, the sheets may be delivered in bundles weighing approximately ten tons to the car, and after the car has reached its destination the bundles may be bodily removed without any individual handling of the sheets or constituent pieces making up the bundle. By handling metal sheets in heavy or bulky bundles and by packing the bundles, in accordance with my invention, it has been possible to eliminate the necessity of oiling the sheets, as well as eliminating the separate handling at any time of the individual sheets and eliminating the damage previously done to the freight cars. This has resulted in an enormous saving. Further advantages resulting therefrom reside in eliminating the expense of burning off the oil from the sheets and washing the sheets before enamelling, and the reduction to a minimum of the number of scratched or defective sheets.

The invention has three distinct phases, namely, (1) the loading; (2) the binding or bracing of the sheets in packs for transit in the car; and (3) the unloading. The loading and unloading operations are very similar in that substantially the same mechanical units may be employed, these units comprising a lifting rack for lowering the pack upon the floor in the loading operation and for raising it from the floor in the unloading operation. The second mechanical unit is a suitable conveying medium adapted to convey the pack to the lifting mechanism in the loading operation and to receive it from the lifting mechanism in the unloading operation for removal of the pack from the car.

A particularly important feature of the invention is the method employed in unloading the material, for the reason that, as stated, it has effected tremendous savings in labor and material. In handling relatively heavy packs of metal for unloading from a freight car, the invention contemplates the use of improved steps which involve the use of relatively simple mechanical units or devices conveniently operable within the relatively confined area of a loaded or partially loaded car and adapted to handle extremely heavy units running as high as ten tons. Each pack is supported on the floor of the car, and, preferably, spaced therefrom as will be later described in detail, each pack having spaced points of support to provide free space or clearance for a portion of the lifting means, which, in the present instance, is in the form of binding or tying straps assisting in holding the sheets of the pack together. At destination, the mechanism used for removing the pack is preferably of a character which may be supported at spaced points disposed on opposite sides of a vertical plane (either transverse or longitudinal) extending through the center of the pack. This mode of supporting the lifting mechanism adjacent the pack distributes the load over the car floor and also insures proper balancing of the pack and of the lifting mechanism during the lifting operation. Attempts have been made to lift relatively heavy packs of this character, by lifting devices which are supported on the car floor at points remote from the pack, but these devices, such, for instance, as portable cranes having booms projecting toward the pack to be lifted, are not only awkward to handle in a car, but tend to tilt under relatively heavy loads.

After the pack is lifted, it is transported through the car door or to the outside of the car by transferring it to a second or other conveying medium than the lifting device, such secondary or horizontal conveying medium being of any suitable form adapted to receive the pack raised by the lifting mechanism and from the latter. Preferably, although not necessarily, it should be adapted to receive the pack from the lifting means without moving the latter while the pack is held in raised position directly above the point on the floor where it has been transported. For this purpose, I utilize a self-propelled truck having a lifting platform adapted to be moved beneath the raised pack to receive it and then transport it from the car. The above general description of the mechanism will be understood more clearly by a more detailed description which will set forth (1) the loading operation; (2) the packing operation; and (3) the unloading operation.

Figures 7, 9:
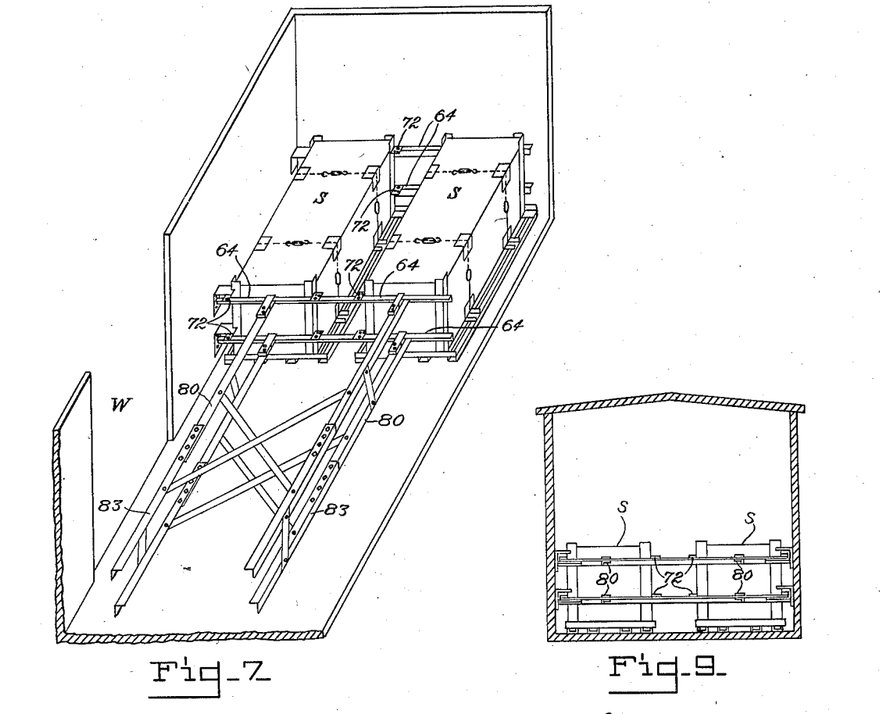
Fig. 7 is a fragmentary perspective view showing a way in which stacks of sheet metal or the like may be loaded within the freight car.
Fig. 9 is a sectional elevation taken on lines 9—9, Fig. 8.
Figure 8:
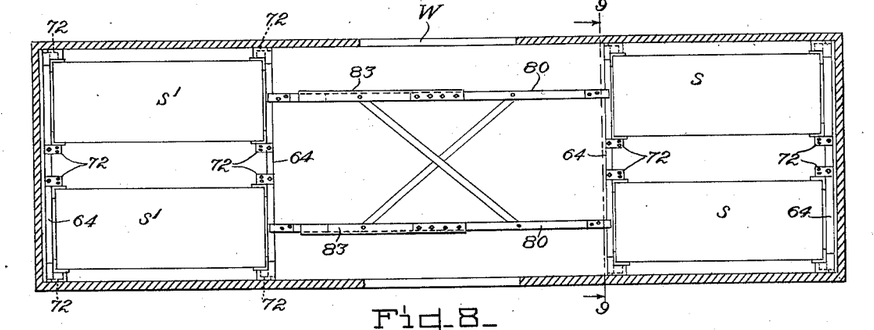
Fig. 8 is a sectional plan view illustrating the manner of loading the stacks or bundles of metal within the freight car.
Figure 10:
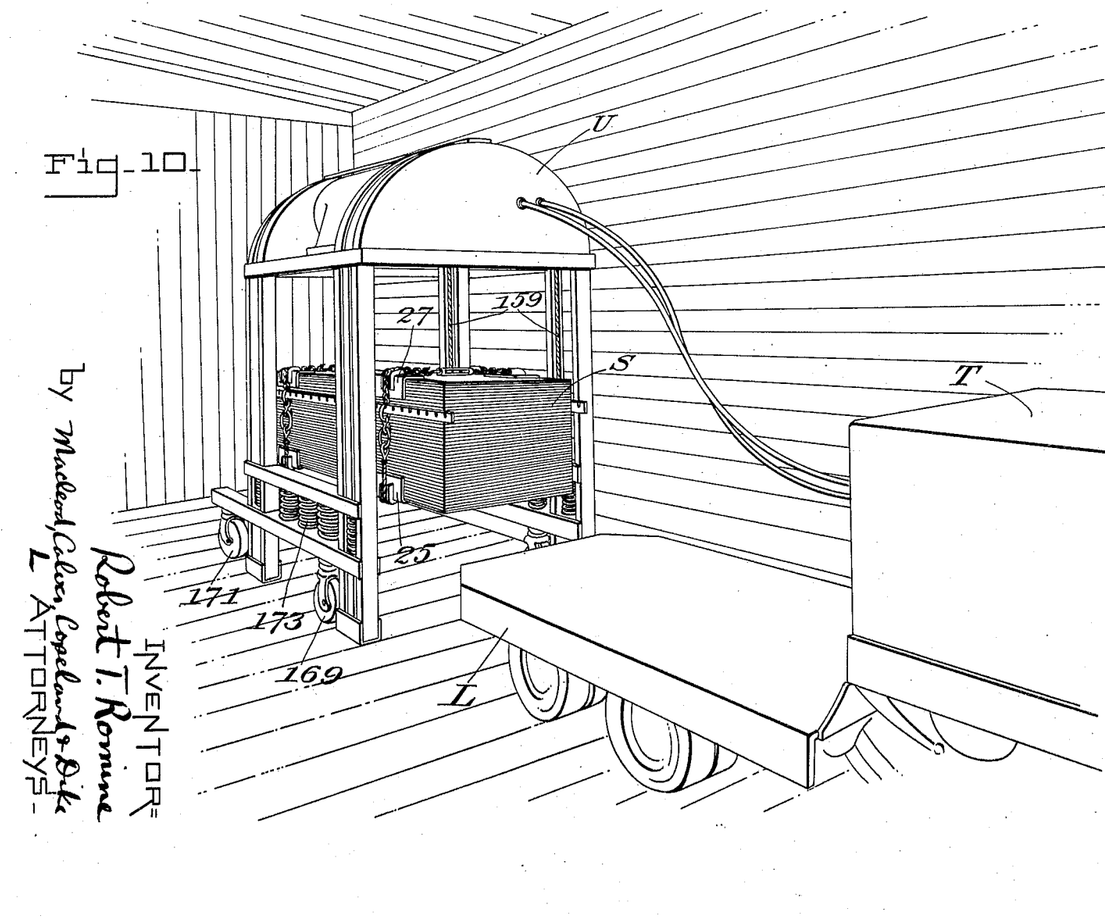
Fig. 10 is a view in perspective somewhat similar to Fig. 5 illustrating the method of lowering the stack of sheets to the floor of the car after it has been removed from the lift truck.

(1) *Loading operation.*—In loading a freight car having approximately forty tons load capacity, I prefer to deliver the steel in four bundles or units of approximately ten tons each, two being preferably placed at each end of the car. In Figs. 7 and 8 are shown a freight car in which two bundles are placed in position on the floor of the car at each end thereof, and ready for shipment. The four bundles are delivered successively to the car and have a combined weight which approximates the load capacity of the freight car. The rack apparatus which is used for clamping or bracing together the stack of sheets in a unit is constructed to accommodate sheets of different widths and lengths and where the sheets are relatively narrow, two piles may be embraced side by side in the rack.

Figure 1:
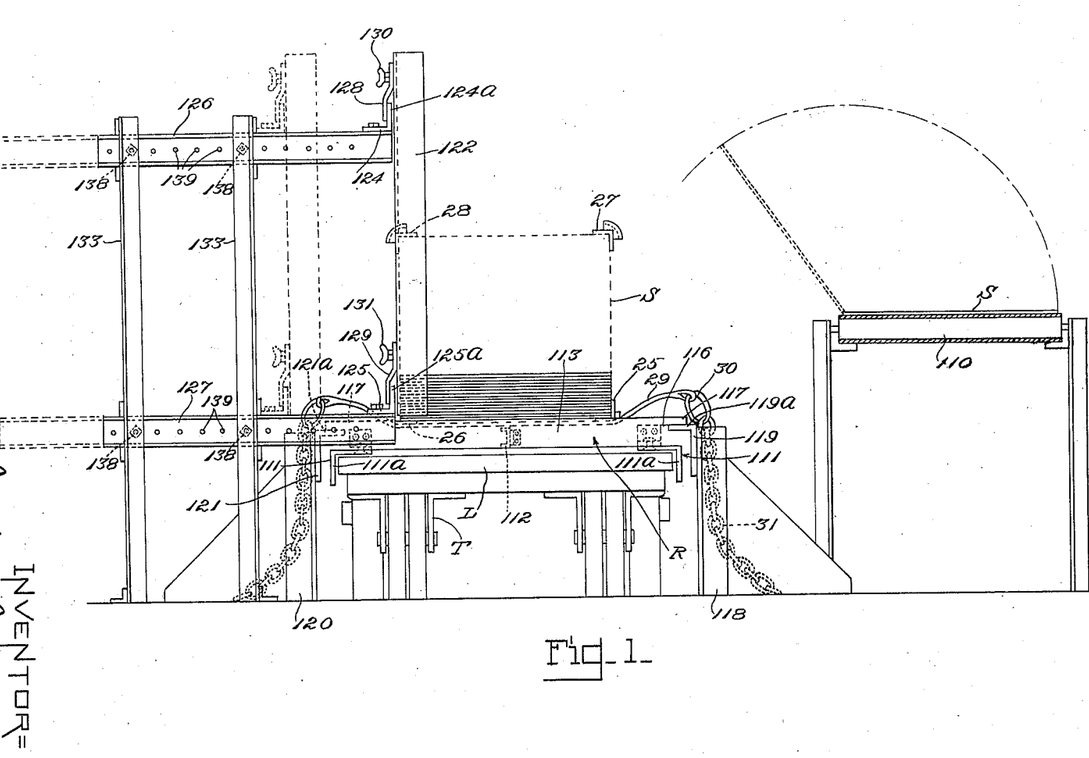
Fig. 1 is an end elevation illustrating the manner of delivering or stacking sheet steel preparatory to the shipment thereof.
Figure 2:
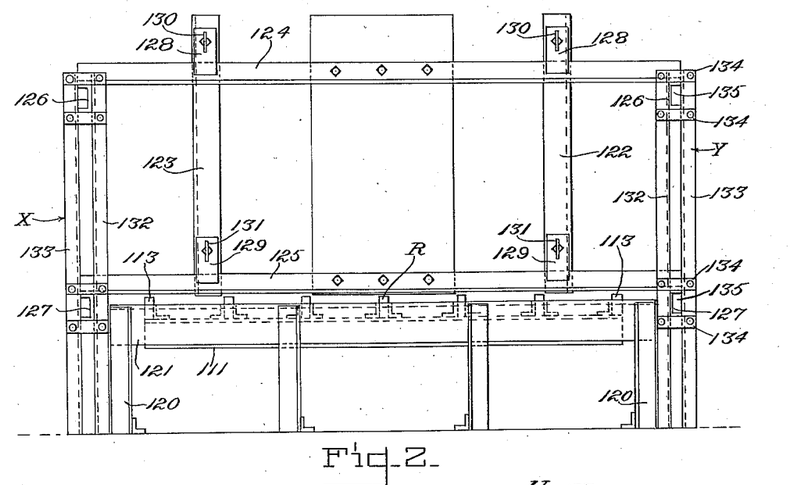
Fig. 2 is a left-hand side elevation of the construction shown in Fig. 1.

Referring to Figs. 1 and 2, I have illustrated the method of handling and loading the metal, such as sheet steel, at the mill preparatory to delivering and packing the sheets in cars for shipment. The metal sheets are carried on a suitable conveyor 110 to the point of delivery, at which point is located at one side of the conveyor a delivery apparatus, including a removable platform or pallet R, for supporting the pile or stack of sheets, or other metal, and in position to be picked up and bodily hauled by a load elevating truck preferably of ten ton capacity.

The pallet or platform R comprises in the present instance a pair of lengthwise extending angle bars 111, the vertical flanges 111$^a$ of which forming spaced guides for guiding the truck T beneath the pallet. A series of spaced cross bars 113 are mounted upon and secured to the side angle bars 111, and are held in position by channel spacer members 112 secured to the cross bars by angles 115. The upper edges of the cross bars 113 extend above the upper edges of the channels, as clearly shown in Fig. 1.

Each cross bar 113 at each end thereof is notched or cut away at 116, thereby providing projecting portions 117 which may be supported upon the horizontal flanges 119$^a$ and 121$^a$ of lengthwise extending angle bars 119 and 121. These angle bars are spaced apart the required distance and supported by suitable legs or supporting brackets 118 and 120.

The sheets S when deposited on the platform or pallet R are guided and positioned in superimposed relation by means of a pair of adjustably spaced vertical guides 122 and 123. These guides are slidingly supported to permit them to be shifted into and out of position over the pallet R. At the upper and lower ends of the guides are located lengthwise extending angle bars 124 and 125 respectively. The upper angle bar 124 is secured at each end to a slide bar 126, and the lower angle bar 125 in like manner is secured at each end to a slide bar 126, and the lower angle bar 125 in like manner is secured at each end to a corresponding slide bar 127. Each guide 122 and 123 at its upper end carries a projecting clamp 128 adapted to fit over the vertical flanges 125$^a$ of the upper angle bar 124. In like manner, each guide 122 and 123 at its lower end carries a similar clamp 129 fitting over the flange 125$^a$. The guide bars 122 and 123 may be adjusted along the supporting bars 124 and 125 to the required positions, and are releasably secured in adjusted positions to the bars 124 and 125 by turning the wing nuts 130 and 131 to tighten the clamps 128 and 129 against the bars.

The slide bars 126 and 127 which carry the guides are mounted in side frames X and Y, comprising spaced pairs of vertical angle bars 132 and 133, the side frames being spaced apart a distance greater than the length of the platform R, as shown in Fig. 2. Vertically spaced plates 134 are secured to the posts 132 and 133 thereby forming guideways 135 for the upper and lower slide bars 126 and 127. These bars may be adjusted in position with respect to the pallet R and held in adjusted position by means of bolts 138 which may be secured in any one of the holes 139 in the bars 126 and 127.

From the foregoing it will be seen that by adjusting the position of the slide bars 126 and 127, the guides 122 and 123 may be properly positioned over the pallet R in accordance with the width of the sheet, enabling the sheets when deposited against the guides to be centered on the pallet. By adjusting the guides toward or from each other, the forwardly extending flanges thereof may be spaced apart sufficiently to permit the sheets to fit therebetween. These guides therefore position and aline the edges of the sheets, thus enabling the piling or stacking of the sheets in uniform relation. In use the pallet or platform R is placed in position on the angle bars 119 and 121 as shown in Fig. 1. The tying cables are laid across the pallet between the cross bars 113. The sheets are removed from the conveyor by turning them on edge and placing them one upon another on the pallet R without sliding the sheets, or in any other suitable manner. When the required number of sheets have been stacked the angle plates 25, 26, 27 and 28 (see Figs. 1 and 6) are placed at the corners of the stack, and the cables 29—31 tied around the stack, these cables being tightened as hereinafter described to clamp the angle plates on the corners of the stack. After the stack S has been formed, it must be delivered to the freight car by a suitable conveying medium; this medium is, in the present instance, the platform L of the truck T which is run into position beneath the pallet R. Thereupon the guides 122 and 123 are slid rearwardly to clear the pallet, as shown in dotted lines, and the truck platform, which although the preferred conveying medium is, in the broader aspect of the invention, merely representative of any appropriate means of conveyance, is elevated sufficiently to enable the pallet or platform R with its load to be carried from its supports and thence to the freight car. It will be seen that by notching the cross members of the platform at 116 the truck platform having substantially as great width as the pallet R may be elevated beneath the angle portions 119ª and 121ª sufficiently to enable the pallet to be cleared from its supports.

In the foregoing description I have illustrated in accordance with my invention the method of loading the metal in piles, stacks or bundles, from the conveyor which delivers the material at the mill. For the purpose of illustrating the invention, the metal is shown in the form of metal sheets or sheet steel.

(2) *Packing operation.*—As above described, a stack or pile, comprising a predetermined number of sheets or pieces, all of a predetermined weight, such as ten tons, is tied together in a bundle on the pallet R, and thereafter the truck platform L is elevated to pick up the pallet and bundle from the supports 118 and 120. The truck may then be run or propelled with its load directly into the freight car through the doorway W of the car (see Fig. 9). When the load S on the pallet R is thus brought into the car it is then removed from the pallet and deposited in position to be secured in the car for shipment. This is accomplished as hereinafter described by means of my improved rack apparatus, shown in Figs. 6 to 9 inclusive.

Figures 3, 4:
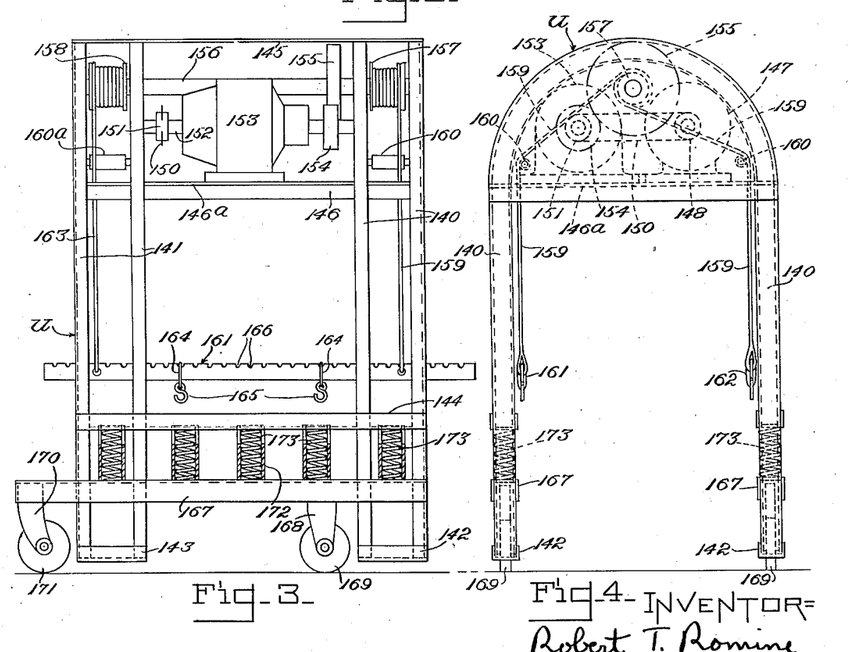
Fig. 3 is a side elevation illustrating a device or lifting rack adapted to bodily pick up or deposit stacks of metal.
Fig. 4 is an end elevation thereof.
Figure 5:
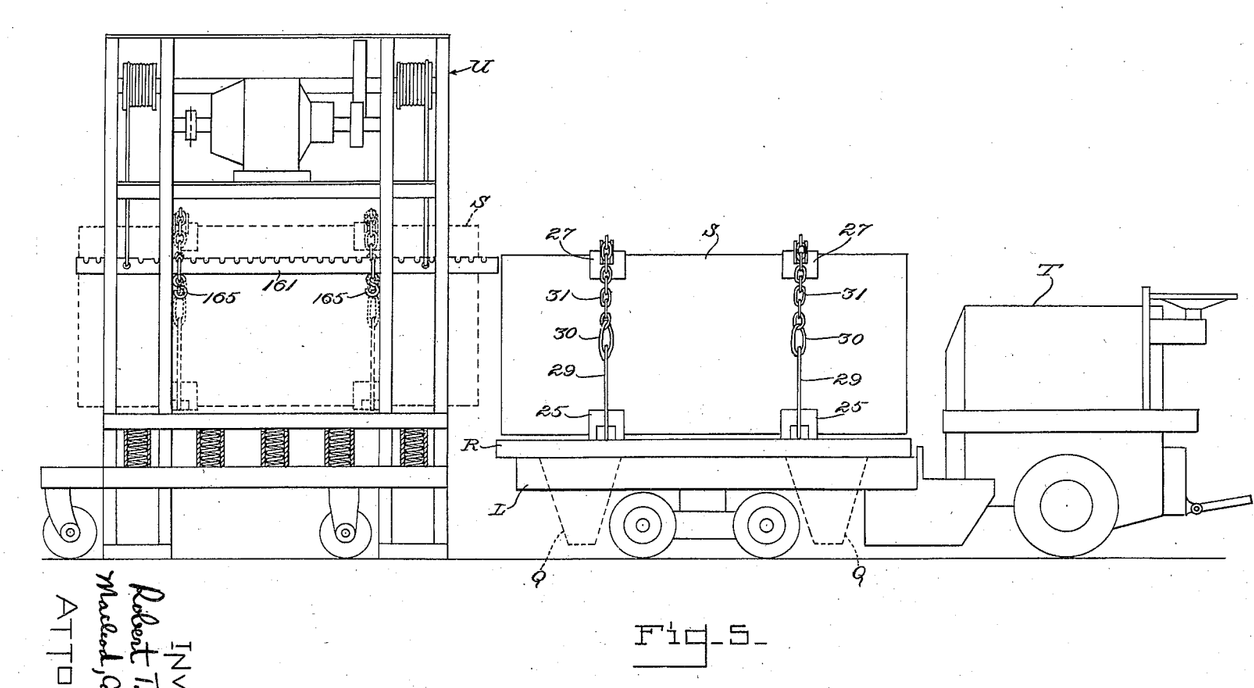
Fig. 5 is a side elevation illustrating the method of handling the loads in the freight car.

Referring to Figs. 3 to 5 inclusive, an elevating rack or lifter is shown for bodily removing the bundle or stack S from the pallet or platform R, to permit the truck T with the pallet remaining thereon to be run out from beneath the bundle, and thereafter depositing it on the floor of the car. The elevating rack U is constructed of a height to permit it to be propelled through the door into the car and also to straddle the load and the rack which is used to pack the bundle in the car. The rack U is at the same time constructed to lift bundles or units of metal preferably of at least ten tons in weight. The framework of the rack comprises in the present instance two parallel pairs of U-shaped angle bars 140 and 141. In the present instance, each of these angle bars is bent into U-shape, thereby providing spaced side frames or supports securely connected together at the tops thereof. Each of the members 140 and 141 extends downwardly into position to form leg supports, and the adjacent pairs are connected together by channels 142 and 143 forming supporting feet for the rack. The frames 140 and 141 are rigidly secured together by means of bars 144, 145 and 146, thereby providing a rigid and strong frame structure. Carried by the side bars 146 is a suitable platform 146ª at the upper portion of the framework, and mounted on this platform is an electric motor 147, driven from any suitable source of power. A sprocket 148 is mounted on the armature shaft 149 of the motor and this sprocket is connected by means of a chain 150 to a sprocket 151 on the shaft 152 of a spur gear reducer 153. Thence the power is transmitted to the driven shaft 156 by means of meshing spur gears 154 and 155.

Figure 6:
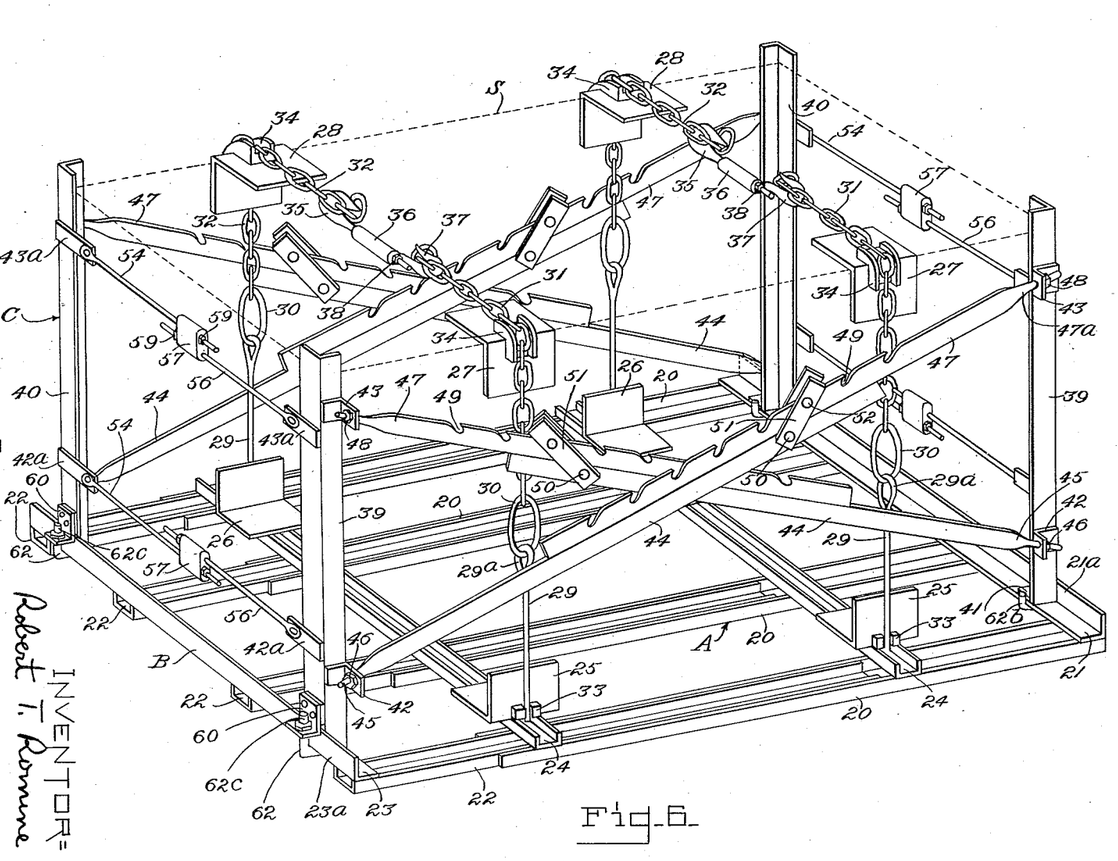
Fig. 6 is a perspective view showing a form of bracing apparatus by means of which a stack or pile of metal may be secured together within the freight car for shipment.

At the opposite ends of the driven shaft 156 are mounted drums 157 and 158. A pair of lifting cables 159 are adapted to be wound and unwound on the drum 157, these cables, as shown in Fig. 6, extending in opposite directions over idlers 160, and thence extending vertically at opposite sides of the frame. Each cable 159 at its lower end is connected at one end of a lengthwise extending lifting bar 161. In like manner the drum 158 is adapted to wind and unwind lifting cables 163 extending over idlers 160ª, and connected at the lower ends thereof to the opposite ends of the lifting bars 161 and 162. Loosely mounted on each bar 161 and 162 are a pair of adjustable links 164 carrying hooks 165. These links may be adjusted into various positions along the bars 161 and 162 in the notches 166, thereby permitting the hooks 165 to be properly spaced in order to hook into the bundle to be lifted. As shown in Fig. 5, the bundle S may be run into position on the truck platform L between the side frames 140 of the rack U, and beneath platform 146ª. Thereupon the hooks 165 are hooked into the links or eyes 30 of the tying elements for the bundle, and upon operating the switch of the motor 147 the bundle S may be lifted sufficiently to clear the pallet R, or the weight of the bundle may be sustained by the mechanism so that the truck platform L may be lowered to clear the bottom of the bundle. Thereupon the truck T with the pallet thereon is run out from beneath the rack U, into the position shown in full lines in Fig. 5. By reversing the motor 147 the bundle S, shown in dotted lines in Fig. 5, may be lowered in position upon the floor of the car, or as hereinafter described, upon the pallet section A of the rack C, shown particularly in Fig. 6. After the bundle has been deposited on the floor of the car, the rack U may be wheeled away from the stack.

Referring to Fig. 3, the rack U is provided with supporting wheels 169 carried by brackets 168 secured to a slide bar 167. This bar is in the form of a channel which is slotted to freely embrace the posts or bars 140 and 141. At the forward end of the truck steering wheels 171 are mounted on swivel arms 170 supported by the spaced slide bars 167. On their upper faces each bar 167 is provided with vertically extending tubular plungers 172, which slide freely through holes in the fixed bar 144 of the frame. Within these plungers are located compression springs 173. These springs are of sufficient strength to support the truck U upon the wheels 169 and 171 without the load. When a load of predetermined weight is suspended from the bars 161 and 162 the springs 173 will be compressed causing the side frames of the rack to descend and support the weight of the load on the feet 142 and 143, thereby taking the weight of the truck and load off the wheels and providing a greater bearing surface by virtue of the feet 142 and 143. As soon as the load has been released in the car, the truck will be automatically supported by its wheels and may then be readily propelled out of position over the bundle.

The four loads of metal preferably have a combined weight approximately equal to the load capacity of the freight car, so that in the case of the standard car having a forty ton capacity, four loads are delivered within the car, two being placed at each end of the car as shown at S and S' in Figs. 7 and 8. Each bundle or pile of sheets is secured together in a unit in such manner as to prevent relative movement of the individual metal sheets in the bundle. In addition the four separate units or bundles are braced apart and from the side walls of the car, resisting relative movement of the bundles during transportation. The entire rack construction or apparatus by which the sheets are tied together in units and secured within the car is adapted to be readily assembled and collapsed to an extent sufficient to permit delivery and removal of the bundle, and in addition is adjustable to accommodate material of varying width and length.

Referring to Figs. 5 and 6, with the bundle suspended from the lifting mechanism of the rack U, and after the truck platform L has been propelled rearwardly from beneath the bundle, the pallet section A (Fig. 6) may be slid into position beneath the bundle. The sections A and B are then telescoped as shown in Fig. 6, and the bundle is lowered upon the cross channels 24 of the pallet. The lifting rack U is then wheeled away from the bundle.

The pallet section A in the present instance is shown as comprising a series of four longitudinal channels 20, and welded across one end thereof is an angle bar 21. The pallet section B also comprises a series of spaced channels 22 of smaller size so as to slidingly fit within the channel members 20. Welded to the ends of the several channels 22 is an angle bar 23. Extending transversely to the pallet and welded to the tops of the channel members 20 are a pair of spaced channels 24.

The stack of sheets when delivered to the car is held together by means of adjustable flexible elements encircling the stack or pile. At the longitudinal corners of the stack are placed a pair of spaced angle members or plates 25, 26, 27 and 28, as clearly shown in Fig. 6. The plates of each set of four are located in transverse alignment, and the bottom plates 25 and 26 are adapted to rest upon the transverse channel members 24 which support the pack at spaced points and raised above the floor. Their channel formation permits reception of the tying cables 29 and the supporting of the pack without its weight resting on these cables. Each set of angle plates is securely clamped or tied against the bundle by a flexible element including a flexible cable 29 extending through grooved guides 33 on the outer sides of the plates 25 and 26, the cable 29 passing around the plates 25 and 26 and through the channel member 24. Each flexible cable 29 terminates in a loop 29ª, to each of which is connected a large link or eye 30, and to each link 30 is connected a flexible chain 31 or 32. The angle plates 27 and 28 are provided with quarter pulleys 34 forming grooved guides for the chains 31 and 32. Chains 31 and 32 are adapted to be drawn together by means of a turnbuckle, thereby drawing the several angle plates 25, 26, 27 and 28 tightly toward each other. In the present instance, a grab hook 35 may be connected to one of the links of chain 32, this hook having a threaded shank extending through the body portion 36 of a grab hook 37, the latter being connected to a link of chain 31. The threaded shank of hook 35 at its free end is provided with an adjusting nut 38 which may be operated by means of a speed wrench thereby drawing together or loosening the chains 31 and 32.

The bundle or pile of sheets is securely clamped together at the upright end corners thereof also by means of angle members and flexible tying elements, the angle members forming posts or buttresses, and designated at 39 and 40. To the bottom of each post 39 and 40 is welded a flat square plate 41. To the post 39 are welded at the bottom and top thereof respectively a pair of brackets 42 and 43. A pair of flexible diagonal straps 44 extend between each diagonally opposed pair of brackets 42 and 43, and each strap 44 terminates in a threaded portion 45 extending through a hole in one of the brackets 42 and is adjusted by means of a nut 46. A pair of diagonal flexible straps 47 cooperate with the straps 44, each terminating in a threaded end 47ª extending through a hole in one of the brackets 43, and adjusted by means of a nut 48. The straps 47 are provided with inclined notches 49 along the upper edges thereof. A swinging clamp 51 is pivoted at 50 to each of the straps 44, these clamps comprising parallel side members embracing opposite sides of the adjacent members 44 and 47, and connected together by means of a cross pin 52 which may be adjusted in any one of the notches 49.

It will be seen that when the angle members 39 and 40 are placed in position at the upright corners of the bundle an approximate adjustment of the members may be obtained by means of clamps 51 adjustably connecting together the pairs of cooperating straps 44 and 47. A fine adjustment is obtained by applying a speed wrench to the nuts 46 and 48.

Adjacent to the angle brackets 42 and 43 and secured to the posts 39 and 40 are plates 42ª and 43ª. The lower and upper pair of plates 42ª and 43ª respectively form attaching means for adjusting devices adapted to draw the posts 39 and 40 together transversely of the bundle. Each adjusting device is identical and comprises a threaded rod 54 pivoted to one of the plates 42ª and an oppositely extending threaded rod 56 pivoted to the opposite plate 42ª. These rods extend in opposite directions through tapped holes in a body member or sleeve 57, and at the free ends of the rods, at opposite sides of the member 57, are located nuts 58 and 59. By applying a speed wrench to either or both of these nuts the rods 54 and 56 may be drawn together endwise thereby drawing posts 39 and 40—in transverse directions against the bundle.

Each of the posts 39 and 40 is releasably clamped to one of the horizontal angle bars 23 and 21 by means of an angle bolt 62. This bolt has a threaded end 62ᶜ extending through a hole drilled in a bracket 60 riveted to one of the posts. The bolt 62 is bent at right angles so as to extend underneath the angle bar 23 or 21, the free end of the bolt being bent upwardly at 62ᵇ to confine the inner edges of angle bar 23 or 21 and plate 41. Thus by tightening the nut 63 on bolt 62 the post 39 or 40 may be releasably clamped to the angle bar 23 or 21.

From the foregoing, it will be seen that the sheets or constituent parts of each stack or bundle are rigidly bound or clamped together, which is accomplished by placing buttresses or members, preferably angle members in position to engage the top, bottom and four upright sides of the stack. These buttresses or members are firmly clamped or bound against the stack of sheets, thereby preventing relative movement of the sheets in any direction and providing a stack which in effect is a single rigid unit.

As shown in Figs. 7 to 9 inclusive the stacks of bundles of metal after being placed in position at opposite ends of the car and after the rack or bracing apparatus has been applied thereto as above described, may be braced within the car as described in my above application. In general this is accomplished by means of transverse extensible braces 64; two of these braces may be positioned across each end of the adjacent stacks S or S' so as to abut against the vertical posts 39 and 40. The braces 64 are longitudinally adjustable so as to be fitted snugly between the opposite side walls of the car and nailed thereto. The horizontal brace members 64 carry pairs of spaced adjustable clamps 72. Each of these clamps is adjustable longitudinally of the bar 64, and the corresponding pairs thereof may be positioned to embrace opposite sides of the stack and prevent lateral displacement thereof during transit.

The bundles or stacks S at one end of the car may be braced from the bundles or stacks S' at the opposite end of the car. This is accomplished by means of longitudinal extensible braces comprising angle bars 80 and 83 telescoped together. Each brace member 80, 83 is longitudinally extensible so as to fit over and engage at opposite ends the transverse brace members 64 which extend between the side walls of the car. In this manner it will be seen that the stacks when desired may be braced apart by means of longitudinal braces 80, 83 and may be held against longitudinal and lateral displacement by means of the several brace members 64 and 72.

(3) *Unloading operation.*—It will also be seen from the foregoing that the bundles or stacks, after the car has reached its destination, may be readily freed to permit removal thereof. It is merely necessary to remove the longitudinal braces 80, 83, loosen clamps 72, and remove the brace members 64. Angle bolts 62 are then removed to disconnect the upright posts and pallet sections. The unloading operation is, in the present instance, carried out by the same mechanical units employed in the loading operation. These units comprise a lifting mechanism to raise the pack above the floor and a secondary conveying means whereby the pack is carried through the car door, the pack being transferred from the lift mechanism to the conveying medium at any suitable point in the car, but, preferably, although not necessarily, at a point directly above the point on the floor where it was located during transit.

Referring to the lifting mechanism, it should preferably be of a character permitting its support upon the car floor in close proximity to the pack as distinguished from a mechanism such as a crane having a forwardly projecting boom which is supported remote from the pack. Moreover, in order to properly distribute the load over the car floor and to insure proper balance of the pack and lift mechanism during the lifting operation, the lift mechanism should preferably be supported on the floor at spaced points disposed on opposite sides of a vertical plane (longitudinal or transverse) extending through the pack. More specifically, a preferred arrangement is to have the point of support of the lifting mechanism arranged in the same transverse plane of the car with the pack or, at any rate, in the immediate vicinity of the pack, so that the load support is transmitted to the car floor at or adjacent opposite sides of the pack.

These desirable characteristics of the lifting mechanism for carrying out the present method are met by the lifting rack which has been heretofore described in detail in connection with the unloading operation, although it will be understood that the invention is not limited to the specific structure of the lift rack which is merely representative of various types of mechanism which might be used in connection with the method. The lifting rack U (see Fig. 4) is wheeled into position to straddle the bundle and pallet sections A and B. Hooks 165 on the lifting bars of the elevating rack are connected to the four eye links 30 of the tying elements of the bundle. Thereupon the bundle is lifted and pallet section A is slid out from beneath the bundle. This enables the truck T to be propelled beneath the bundle and between the side frames of rack U, the wheels of the truck T travelling unimpeded between channels 22 of the rear pallet section B, which does not need to be removed from beneath the bundle. The load or bundle is then lowered by the elevating rack U upon truck platform L, or preferably upon a platform such as the pallet R provided with legs Q (see Fig. 4). The truck is then propelled out of the freight car and the bundle S and platform R may be transported and delivered at any suitable delivery or storage place. In this manner a freight car of forty tons capacity, loaded with four ten ton bundles or stacks, may be quickly and automatically unloaded without breaking up the bundles and without any manual handling of the separate parts of the bundles or piles.

As has been hereinbefore explained, the lift truck is simply disclosed herein to designate a suitable type of secondary conveying medium to receive the raised or lifted pack from the lifting mechanism in order that it may be conveniently transported through the car door. It will be understood, of course, that the unloading method is not limited to the use of this particular conveying medium and other types adapted to be disposed beneath a pack which has been lifted and to effect conveyance of the same through the car door might well be used within the invention.

It will be seen that the foregoing method greatly expedites and facilitates the loading and unloading of freight cars, thereby rapidly releasing the cars in the freight yards and increasing the amount of stock or freight which may be unloaded or loaded during a given period of time. In addition the present method eliminates a large proportion of the labor expense heretofore required in loading and unloading bulky or heavy material. Where previously the maximum loads hauled or trucked in freight yards, warehouses, or storage places approximated not over two or three tons, by virtue of the present invention loads ranging from five to ten or even fifteen tons may be transported to the freight cars, unloaded and thereafter removed from the cars without any separate manual handling of the loads or without breaking up the bundles or units and without the separate manual handling thereof to load or unload.

In the present case I have illustrated the invention as applied to the loading, unloading and transporting of sheet steel in stacks. It will be seen that my method and improved apparatus enable the sheet steel after leaving the rolling mill to be handled in units, bundles or stacks preferably ranging from five to ten tons. In the case of sheet steel used in automobile body building, I handle the metal preferably in units of approximately ten tons, four of which may be loaded in a freight car of forty ton capacity. In this instance the metal is hauled in unitary stacks into and out of the car on a self propelled load elevating industrial truck of ten ton capacity.

In the handling of sheet steel alone my invention enables vast savings not only to the steel mills, but to the railroads and the manufacturer as well, such as manufacturers of automobiles. Shipments are speeded up, congestion in freight yards is reduced, freight cars are quickly released for further use, freight cost reduced and damage to freight cars largely eliminated. In addition to the foregoing all the labor expense heretofore required in separately loading and unloading the sheets at different stages of transportation is done away with. The cost of oiling the sheets is saved. Losses due to scratching the sheets caused by workmen in sliding the sheets when loading and unloading are eliminated. The cost of removing the oil from the sheets and washing the sheets preparatory to enamelling is saved; and better and cheaper enamel jobs permitted where the sheets have not been previously oiled. As regards the handling of sheet steel, without reference to other materials, I believe I am the first to conceive and to accomplish the automatic handling of sheet metal, oiled or unoiled sheet steel, or other heavy finished material in relatively heavy stacks, enabling a car of forty ton capacity to be quickly loaded by hauling thereinto four successive ten ton loads and automatically depositing the same; also enabling such a car to be quickly unloaded by picking up and hauling out of the car four ten ton loads. Thus where it heretofore took a number of workmen a number of hours to load forty tons of sheet steel in a car and after shipment to unload the same, I am able to accomplish this automatically in a few minutes, and with less workmen.

As has been previously explained although the method has been described in connection with certain specific mechanical units which are particularly useful in practicing the method, it is not limited to these specific types of mechanisms except in so far as they are defined by the following claims.

What I claim is:

1. The herein described method of handling metal, such as sheet metal, which consists in positioning the same in relatively heavy packs on the floor of a box car to provide clearance for lifting means thereunderneath, maintaining the constituent parts of each pack together during transit against such relative movement or displacement of the parts as would prevent removal as units at destination, and removing the packs at destination as units by lifting each pack through means supported from the car floor within the same transverse plane of the car with the pack and then transporting the lifted pack through the car door by transferring the pack to a second conveying medium from said lifting means.

2. The herein-described method of handling metal consisting in binding the stacks of metal together to exert sufficient pressure to hold the constituent parts together against substantial relative movement in transit, loading the bound stacks for transportation on the car floor and maintaining the stacks in such positions as to provide and retain in transit sufficient aisle spaces at opposite longitudinal sides of the stack to permit a stack lifting device to straddle opposite sides of each stack and bodily lift it with sufficient of its binding means to hold the parts together.

3. The herein described method of unloading heavy bundles or packs, such as sheet metal, positioned on a freight car floor with the constituent parts of each pack braced together against such relative movement in transit as would prevent removal as units at destination, which consists in lifting the bundle vertically above the car floor, moving a platform beneath the bundle in the space on the floor previously occupied by the bundle, transferring the bundle to the platform, and propelling the platform with its load off the car.

4. The herein described method of unloading heavy bundles or packs, such as sheet metal, transported on a freight car floor with each pack supported at spaced points and braced against such relative movement in transit as would prevent removal as units at destination, which consists in positioning lifting means on the car floor and supporting the same at spaced points, with the points of support of the pack and lifting means one disposed outside the other, lifting the pack vertically above the car floor, and conveying the pack as a unit off the car.

5. The herein described method of loading heavy bundles or packs, such as sheet metal, on a freight car which consists in propelling the bundle as a unit on a platform onto the car floor, supporting the bundle free of the platform and removing the latter from beneath the bundle, lowering the bundle to the floor in the space previously occupied by the platform and bracing each pack so that its constituent parts are held against such relative movement in transit as would prevent removal as a unit at destination.

6. The herein described method of unloading metal, such as sheet metal, in heavy packs from a freight car, with each pack bound together against such relative movement of its constituent parts in transit as would prevent removal as a unit at destination, which consists in lifting the pack and supporting it from the floor of the car at opposite sides of the pack while the latter is being lifted, introducing a conveying medium between the points of support and beneath the pack, and conveying the pack as a unit out of the car.

7. The herein-described method of unloading a stack of metal, such as sheet metal, transported on the car floor, consisting in lifting the stack from above the stack by transferring the weight of the stack to devices extending beneath the stack, protecting the metal at the bottom corners of the stack against damage from said devices, and carrying said stack as a unit off the car.

8. The herein described method of unloading heavy bundles or packs, such as sheet metal, transported on a freight car floor with the packs braced against such relative movement in transit as would prevent removal as units at destination, which consists in positioning lifting means on the car floor and supporting the same on the car floor at spaced points at opposite sides of the center of the pack, lifting the pack vertically and supporting it on a conveying means extending beneath the pack into the space previously occupied by the pack, and carrying the pack as a unit off the car.

9. The herein described method of unloading heavy bundles or packs, such as sheet metal, transported on members positioned beneath the packs on the car floor with spaces provided at opposite sides of a vertical center plane of each pack and with the packs braced to maintain them against such relative movement in transit as would prevent removal at destination, which consists in lifting the packs as units vertically above said members by lifting means supported on the car floor in said spaces at opposite sides of a vertical center plane of the pack and conveying the lifted pack as a unit through the car doorway.

10. The herein described method of unloading metal, such as sheet metal, arranged in packs positioned on the floor of a freight car with the constituent parts of each pack bound together to prevent such relative movement in transit as would prevent removal at destination as units, which consists in lifting the bundle above the car floor by distributing the weight of the bundle at four points beyond opposite sides of the bundle and transmitting the lifting force from the points at each side of the bundle in substantially parallel vertical directions, and bodily conveying the bundle from the car.

11. The herein described method of handling metal, consisting in positioning and binding stacks of metal on the car floor to hold the constituent parts together against substantial relative movement in transit and to retain in transit longitudinal spaces between and at opposite sides of the packs, and at destination supporting a lifting device in said spaces to straddle the stack, lifting the stack and taking it from the car.

12. The herein described method of transporting metal on the floor of a freight car, consisting in positioning heavy packs of the metal on the car floor with brace or binding elements extending at the sides and beneath the pack for maintaining the constituent parts of each pack together, and supporting the packs during transit on members sustaining the weight of the pack substantially free of said elements and held in predetermined relation to the pack.

13. The herein described method of transporting metal on the floor of a freight car, consisting in positioning heavy packs of the metal on the floor of a box car with brace or binding elements extending at the sides and beneath the pack for maintaining the constituent parts of each pack together, and supporting the packs during transit on members sustaining the weight of the pack substantially free of said elements and held in predetermined relation to the pack, and at destination lifting the pack as a unit by means positioned within the box car, and carrying the pack bodily through the car doorway.

14. The herein described method of unloading metal such as finished sheet metal from box cars having the metal arranged therein in relative heavy packs, which consists in lifting each pack individually above the car floor by means supported within the car upon the car floor and in the same transverse plane of the car with the pack, and transporting the same through the car door by transferring it to a conveying medium.

15. The method of loading metal in a freight car which consists in piling the metal on a movable platform, lifting the platform and stack from beneath and transporting them bodily into the freight car, lifting the stack from the platform and depositing it on the car floor.

16. The hereindescribed method of loading a freight car which consists in piling the metal in a stack on a movable platform, raising the platform and stack from beneath and transporting them bodily into the freight car, raising the stack from the platform by lifting device which straddles the stack, removing the platform and lowering the stack to the car floor.

17. The herein described method of handling metal, such as sheet metal, transported in relatively heavy packs on the floor of a box car, with the packs supported spaced from the floor to provide spaces for lifting means thereunder and the constituent parts of each pack maintained during transit against such relative movement or displacement as would prevent removal of the packs as units at destination, which consists in removing the packs at destination as units by lifting each pack through means supported from the car floor within the same transverse plane of the car with the pack and then transporting the lifted packs through the car door.

18. The herein described method of transporting metal, such as sheet metal, consisting in positioning packs of metal on a freight car floor so as to provide aisle spaces at the sides of the packs to accommodate a lifting device, and bracing the constituent parts of each pack together against substantial relative movement so as to retain in transit such aisle spaces, and at destination placing a lifting device in said spaces, lifting the pack and taking it from the car.

19. The herein-described method of shipping metal which consists in piling the metal, such as sheet steel, in a stack on a platform, binding the stack together as a unit with members embracing the top, bottom and sides of the stack, picking up the platform and stack on a self-propelled load elevating truck, propelling the truck directly into a freight car, and removing the stack as a unit from the truck and platform to the car while maintaining the constituent parts of the stack intact at all times.

20. The herein-described method of loading a freight car which consists in piling the metal in a stack on a movable platform, raising the platform and stack from beneath and transporting them bodily into the freight car, supporting the stack independently of the platform, removing the platform from beneath the stack, and lowering the stack to the car floor.

21. The herein described method of unloading metal, such as sheet metal, transported on the floor of a freight car in packs having binding means adapted to retain their constituent parts against separation in transit, which consists in lifting the stack as a unit above the car floor through a connection with a portion of its binding means, moving the load elevating platform of a lift truck beneath the lifted pack to receive it, depositing the pack upon the said platform and propelling the truck out of the car with said pack.

22. The herein described method which consists in placing metal in a pile or stack on a platform, then tying the same together in a bundle, propelling a truck beneath the platform, transporting the platform with its load on the truck to a point of delivery, and removing the bundle as a unit from the platform.

23. The herein described method which consists in placing metal sheets in a stack on a raised platform with tying devices embracing the stack and holding the sheets together as a unitary bundle, lifting the platform from beneath and transporting it with its load, and removing the bundle from the platform by connecting a hoisting mechanism to said tying devices.

24. The herein-described method of handling sheet metal or the like, consisting in binding the pack of metal together with elements extending transversely around and beneath the pack, protecting the corner portions of the pack from said elements, and supporting the pack on the car floor free of said elements upon means fixed to said pack whereby the latter is substantially immovable relative to said means.

25. The herein-described method of handling sheet metal or the like, consisting in binding the pack of metal together with elements extending transversely around and beneath the pack, protecting the corner portions of the pack from said elements, supporting the pack on the car floor free of said elements upon means bound to said pack whereby the latter is substantially immovable relative to said means, and lifting the entire pack as a unit relatively to the car floor when loading or unloading the car.

26. The herein described method of unloading metal, such as finished sheet metal, from box cars having the metal arranged therein in relatively heavy packs spaced above the floor to provide clearance therebeneath for lifting means, which consists in lifting each pack individually above the car floor by means supported within the car upon the car floor and in the same transverse plane of the car with the pack and transporting the same through the car door by transferring it to a conveying medium.

27. The herein described method of handling and protecting during freight transit, metal such as finished sheets, which consist in positioning the same in relatively heavy packs, each made up of a relatively large number of unboxed constituent parts or sheets on the floor of a freight car having side walls and arranging the packs so as to provide spaces between the adjacent packs and between the packs and the walls of the car, there being a space at each side of each pack whereby lifting means may be introduced at opposite sides of the packs, bracing each pack so that its constituent parts are held during transit against such relative movement as would prevent removal of the packs as units at destination, or would permit them to engage the car walls during transit, and at destination unloading the metal by lifting the packs individually without separate handling of the constituent parts by lifting means arranged in said spaces, and carrying them as units through the car door while maintaining the packs intact.

28. The herein described method of unloading metal such as finished sheet metal, from box cars having the metal arranged therein in relative heavy packs, which consists in lifting each pack individually above the car floor by means supported within the car upon the car floor in the same transverse plane of the car with the pack and at spaced points on opposite sides of a vertical plane extending through the center of the pack, and transporting the same through the car door by transferring it to a conveying medium.

29. The herein described method of unloading heavy bundles or packs, such as sheet metal, transported on members positioned beneath the packs on the car floor with spaces provided at opposite sides of a vertical center plane of each pack and with the packs braced to maintain them against such relative movement in transit as would prevent removal at destination, which consists in lifting the packs as units vertically above said members by lifting means arranged in said spaces and supported on the car floor at spaced points on opposite sides of a vertical center plane of the pack which plane extends longitudinally of the car and in the immediate vicinity of the pack and conveying the lifted pack as a unit through the car doorway.

In testimony whereof I affix my signature.

ROBERT T. ROMINE.